(12) United States Patent
Kataoka

(10) Patent No.: US 8,089,594 B2
(45) Date of Patent: Jan. 3, 2012

(54) LIQUID CRYSTAL DISPLAY DEVICE AND METHOD OF MANUFACTURING THE SAME

(75) Inventor: Shingo Kataoka, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 602 days.

(21) Appl. No.: 11/434,516

(22) Filed: May 16, 2006
(Under 37 CFR 1.47)

(65) Prior Publication Data
US 2007/0120092 A1    May 31, 2007

(30) Foreign Application Priority Data
May 16, 2005   (JP) .................................. 2005-142769

(51) Int. Cl.
    *G02F 1/1343* (2006.01)
(52) U.S. Cl. ........................................ 349/129; 349/139
(58) Field of Classification Search .................... 349/56, 349/84, 122, 123, 132, 129, 139
    See application file for complete search history.

(56) References Cited

U.S. PATENT DOCUMENTS

| | | | |
|---|---|---|---|
| 6,157,425 A * | 12/2000 | Kuo et al. ........................ 349/88 |
| 6,335,211 B1 * | 1/2002 | Lee .................................. 438/22 |
| 6,437,845 B1 * | 8/2002 | Yamada et al. ................. 349/129 |
| 6,567,144 B1 * | 5/2003 | Kim et al. ....................... 349/128 |
| 6,633,356 B1 * | 10/2003 | Kataoka et al. ................ 349/129 |
| 6,661,488 B1 * | 12/2003 | Takeda et al. .................. 349/117 |
| 6,778,229 B2 * | 8/2004 | Inoue et al. ...................... 349/39 |
| 6,977,704 B2 * | 12/2005 | Kataoka .......................... 349/130 |
| 2002/0021401 A1 * | 2/2002 | Kataoka .......................... 349/178 |
| 2002/0159018 A1 | 10/2002 | Kataoka et al. |
| 2003/0048401 A1 * | 3/2003 | Hanaoka et al. ............... 349/123 |
| 2003/0058374 A1 * | 3/2003 | Takeda et al. .................... 349/33 |
| 2003/0086044 A1 * | 5/2003 | Inoue et al. ..................... 349/141 |
| 2005/0030458 A1 * | 2/2005 | Sasabayashi et al. .......... 349/129 |
| 2005/0099582 A1 | 5/2005 | Doi et al. |
| 2005/0128371 A1 * | 6/2005 | Ueda et al. ....................... 349/33 |
| 2005/0146664 A1 * | 7/2005 | Hanaoka et al. ............... 349/130 |
| 2005/0253988 A1 * | 11/2005 | Inoue et al. ..................... 349/139 |
| 2005/0264730 A1 * | 12/2005 | Kataoka et al. ................ 349/114 |
| 2006/0066793 A1 * | 3/2006 | Ohmuro et al. ................ 349/129 |
| 2006/0250556 A1 * | 11/2006 | Kataoka et al. ................ 349/129 |

FOREIGN PATENT DOCUMENTS

| | | |
|---|---|---|
| JP | 2000-347174 | 12/2000 |
| JP | 2002-107730 | 4/2002 |
| JP | 3520376 | 2/2004 |
| WO | WO 2008007583 A1 * | 1/2008 |

* cited by examiner

*Primary Examiner* — Mark Robinson
*Assistant Examiner* — Peter Radkowski
(74) *Attorney, Agent, or Firm* — Nixon & Vanderhye P.C.

(57) ABSTRACT

A vertically aligned liquid crystal display device such as of the MVA mode and a method of manufacturing the same featuring favorable viewing angle characteristics. The liquid crystal display device includes an electrode formed on at least one substrate of a pair of substrates to apply a voltage to the liquid crystal molecules, a first alignment control layer for vertically aligning the liquid crystal molecules and a liquid crystal layer that are held between the pair of substrates, and a second alignment control layer of an ultraviolet ray-cured product formed after the liquid crystal layer is held between the pair of substrates, wherein the second alignment control layer is so formed that there exist two or more regions of different threshold voltages in each display pixel, at least one region has a threshold voltage higher than a threshold voltage produced by the first alignment control layer, and a pre-tilted angle θp of not smaller than 86° but smaller than 90° is possessed by all regions.

4 Claims, 12 Drawing Sheets

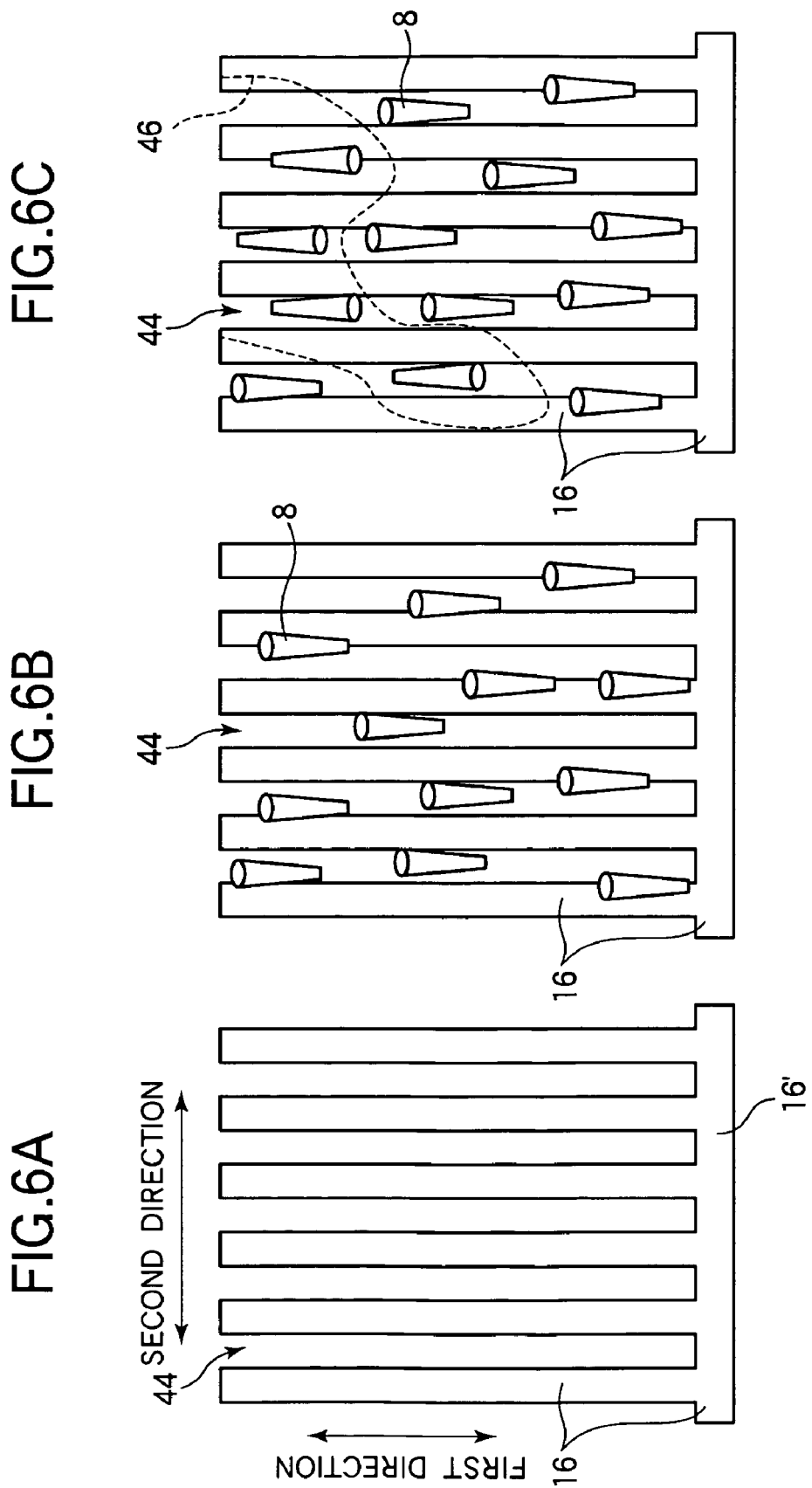

FIG.14
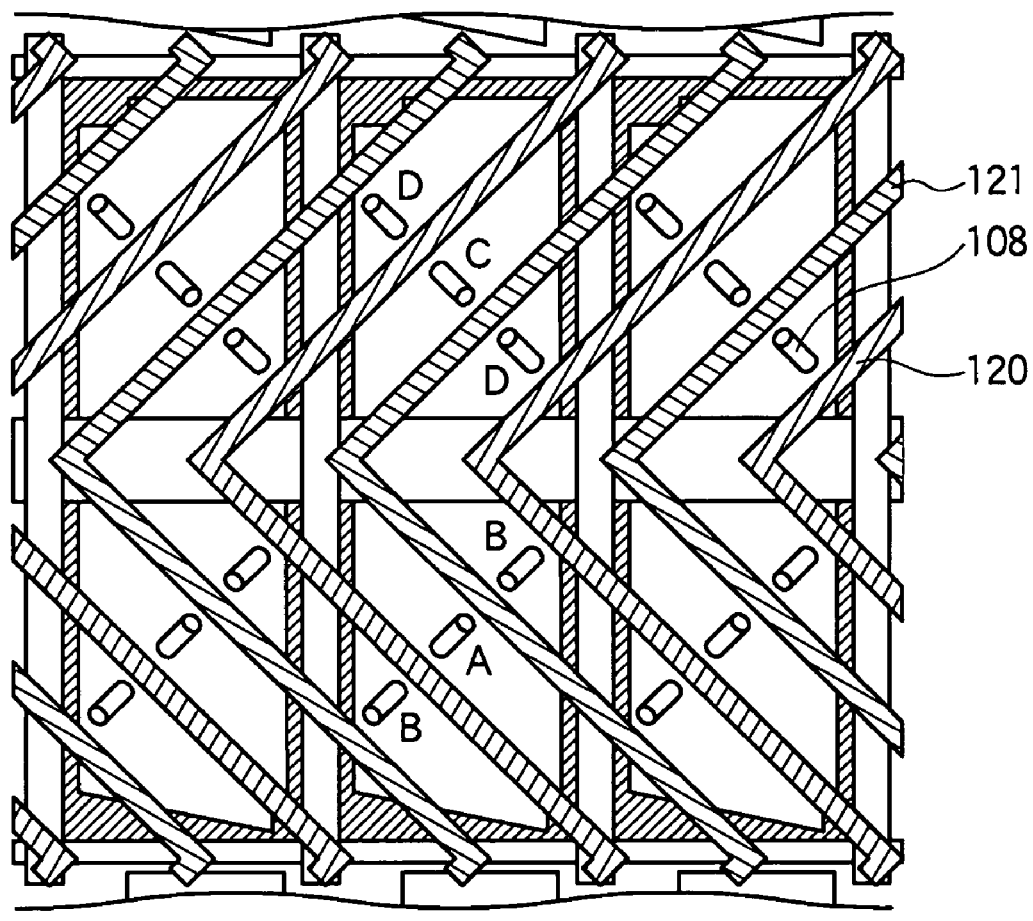
DIRECTIONS OF DOMAINS

LIQUID CRYSTAL DISPLAY DEVICE AND METHOD OF MANUFACTURING THE SAME

BACKGROUND OF THE INVENTION

1. Field of the Invention

The present invention relates to a liquid crystal display device and a method of manufacturing the same. More particularly, the invention relates to a vertically aligned liquid crystal display device such as of the MVA mode and to a method of manufacturing the same.

2. Description of the Related Art

As the active matrix-type liquid crystal display device (LCD), there has heretofore been widely used a liquid crystal display device of the TN (twisted nematic) mode in which a liquid crystal material having a positive dielectric anisotropy is so arranged as to be horizontal with respect to the surface of a substrate but is twisted by 90 degrees between the opposing substrates. However, the liquid crystal display device of the TN mode is accompanied by a problem of poor viewing angle characteristics, and study has been extensively forwarded in an attempt to improve viewing angle characteristics.

As a mode to substitute for the TN mode, the applicant of the present application is developing a liquid crystal display device of the MVA (multi-domain vertical alignment) mode in which the liquid crystal material having a negative dielectric anisotropy is vertically aligned and the directions of tilt of liquid crystal molecules are limited by protrusions formed on the surface of the substrate and slits formed therein when a voltage is applied. The liquid crystal display device of the MVA mode has succeeded in greatly improving the viewing angle characteristics.

A general liquid crystal display device of the MVA mode will now be described with reference to FIGS. 13A to 14. FIGS. 13A and 13B are schematic views of when the cross section of the liquid crystal display device of the MVA mode is viewed aslant. FIG. 14 is a schematic view illustrating the constitution of three pixels in the liquid crystal display device of the MVA mode and the directions of alignment of the liquid crystal molecules. In the liquid crystal display device of the MVA mode as shown in FIGS. 13A and 13B, liquid crystal molecules 108 of a liquid crystal material having a negative dielectric anisotropy are aligned nearly vertically to the surface of the substrate between two pieces of glass substrates 110 and 111. Though not illustrated, a pixel electrode connected to a thin-film transistor (TFT) is formed on one glass substrate 110 for each pixel region, and a common electrode is formed on the whole surface of the other glass substrate 111. Protrusions 120 are formed on the pixel electrode, and protrusions 121 are formed on the common electrode. The protrusions 120 and 121 are alternately arranged. Vertical alignment films that are not shown are formed on the pixel electrodes, on the common electrode and on the protrusions 120 and 121.

When the TFT is turned off and no voltage is applied to the liquid crystal molecules 108, the liquid crystal molecules 108 are aligned nearly vertically to the interface of the substrate as shown in FIG. 13A. When the TFT is turned on and a predetermined voltage is applied to the liquid crystal molecules 108, the directions of tilt of the liquid crystal molecules 108 are limited by the structure of the protrusions 120 and 121. Therefore, the liquid crystal molecules 108 are aligned in a plurality of directions as shown in FIG. 13B. For example, when the protrusions 120 and 121 are formed as shown in FIG. 14, the liquid crystal molecules 108 are aligned in four directions A, B, C and D in each pixel. In the liquid crystal display device of the MVA mode, as described above, the liquid crystal molecules 108 are arranged in a plurality of directions in each pixel when the TFT is turned on, and favorable viewing angle characteristics are obtained.

In the liquid crystal display device of the MVA mode, the directions of tilt of the liquid crystal molecules 108 are not limited by the alignment film. Therefore, the MVA mode does not require the step of alignment such as rubbing that is needed by the horizontal alignment mode as represented by the TN mode. This offers advantages from the standpoint of a process eliminating the problem of static electricity and dirt caused by rubbing and eliminating the step of washing after the alignment processing. This further offers an advantage from the standpoint of display quality without developing display shading that stems from the dispersing pre-tilt. As described above, further, the liquid crystal display device of the MVA mode can be manufactured at a decreased cost owing to a simplified manufacturing process and an improved manufacturing yield and, further, features a high display quality.

However, the liquid crystal display device of the MVA mode, too, has a serious problem that must be improved. FIG. 15A is a graph illustrating gradation viewing angle characteristics of the liquid crystal display device of the MVA mode. FIG. 15B is a diagram illustrating the polar angle and the azimuth angle. As shown in FIGS. 15A and 15B, when the transmittance-voltage characteristics (T-V characteristics) in a tilted direction (polar angle of 60°, azimuth angle of 45°) are compared with the T-V characteristics in the front direction (polar angle of 0°), there exist a gradation region where the transmittance increases in a tilted direction with respect to the transmittance in the front direction, and a gradation region where the transmittance decreases with respect to the transmittance in the front direction. In the liquid crystal display device of the MVA mode, therefore, there occurs a problem in that the chromaticity that is viewed from the front direction deviates from the chromaticity that is viewed from a tilted direction.

Patent document 1: Japanese Patent No. 3520376.
Patent document 2: JP-A-2000-347174
Patent document 3: JP-A-2002-107730

SUMMARY OF THE INVENTION

It is an object of the present invention to provide a liquid crystal display device for obtaining favorable viewing angle characteristics and a method of manufacturing the same.

The above object is accomplished by a liquid crystal display device in which an electrode is formed on at least one substrate of a pair of substrates to apply a voltage to the liquid crystal molecules, a first alignment control layer for vertically aligning the liquid crystal molecules and a liquid crystal layer are held between the pair of substrates, and a second alignment control layer of an ultraviolet ray-cured product is formed after the liquid crystal layer is held between the pair of substrates;

wherein the second alignment control layer is so formed that there exist two or more regions of different threshold voltages in each display pixel, at least one region has a threshold voltage higher than a threshold voltage produced by the first alignment control layer, and a pre-tilted angle θp of not smaller than 86° but smaller than 90° is possessed by all regions.

In the liquid crystal display device of the present invention, a structural pattern is formed on at least one substrate of the pair of substrates extending in a first direction in parallel with the surfaces of the substrates and periodically changing in a second direction in parallel with the surface of the liquid crystal layer and perpendicularly to the first direction and, when a voltage is applied, the liquid crystal molecules are tilted in substantially the first direction.

In the liquid crystal display device of the present invention, the structural pattern is formed by a combination of two or more unit patterns.

In the liquid crystal display device of the present invention, the structural pattern is formed by a combination of two sets of two unit patterns having dissimilar first directions and second directions, and the liquid crystal molecules in the display region are tilted in substantially four different directions.

In the liquid crystal display device of the present invention, the structural pattern is a protruding structure having electric insulation or is a structure of skipping the electrode.

In the liquid crystal display device of the present invention, the structural pattern is formed on only the side of the substrate on where active elements are provided for operating the liquid crystals.

In the liquid crystal display device of the present invention, the active elements and color filters are provided on the same side of the substrate.

In the liquid crystal display device of the present invention, each pixel is divided chiefly into two regions of different threshold voltages, and the ratio of division is 2:8 to 8:2.

The above object is accomplished by a method of manufacturing a liquid crystal display device by forming an electrode on at least one substrate of a pair of substrates to apply a voltage to the liquid crystal molecules, holding a first alignment control layer for vertically aligning the liquid crystal molecules and a liquid crystal layer between the pair of substrates, and forming a second alignment control layer of an ultraviolet ray-cured product after the liquid crystal layer is held between the pair of substrates;

wherein the second alignment control layer is formed through a first process of irradiating ultraviolet rays in a state where part of a display pixel is shielded or dimmed while applying a voltage to the liquid crystal layer.

In the method of manufacturing the liquid crystal display device of the present invention, after the first process, a second process is executed for irradiating ultraviolet rays in a manner that the threshold voltage in the region where the light is shielded or dimmed through the first process becomes lower than the threshold voltage in the region where the light is neither shielded nor dimmed through the first process.

In the method of manufacturing the liquid crystal display device of the present invention, the second process irradiates ultraviolet rays at an intensity smaller than that of the first process.

In the method of manufacturing the liquid crystal display device of the present invention, the second process irradiates ultraviolet rays while applying a voltage to the liquid crystal layer.

In the method of manufacturing the liquid crystal display device of the present invention, the second process irradiates ultraviolet rays to the whole panel surface.

The above object is accomplished by a method of manufacturing a liquid crystal display device by forming an electrode on at least one substrate of a pair of substrates to apply a voltage to the liquid crystal molecules, holding a first alignment control layer for vertically aligning the liquid crystal molecules and a liquid crystal layer between the pair of substrates, and forming a second alignment control layer of an ultraviolet ray-cured product after the liquid crystal layer is held between the pair of substrates;

wherein the second alignment control layer is formed through:

a first process of irradiating ultraviolet rays in a state where part of a display pixel is shielded or dimmed;

a second process of irradiating ultraviolet rays at an intensity smaller than that of the first process; and a third process of irradiating ultraviolet rays onto the whole panel surface at an intensity smaller than that of the second process and in a state of applying no voltage.

The present invention realizes a liquid crystal display device which features favorable viewing angle characteristics and a method of manufacturing the same.

BRIEF DESCRIPTION OF THE DRAWINGS

FIGS. 6A to 6C are views illustrating a partial constitution of a pixel in the liquid crystal display device of the embodiment of the invention;

FIG. 14 is a view schematically illustrating the constitution of three pixels in the liquid crystal display device of the MVA mode and the directions of alignment of liquid crystal molecules.

DESCRIPTION OF THE PREFERRED EMBODIMENTS

Figure 1:
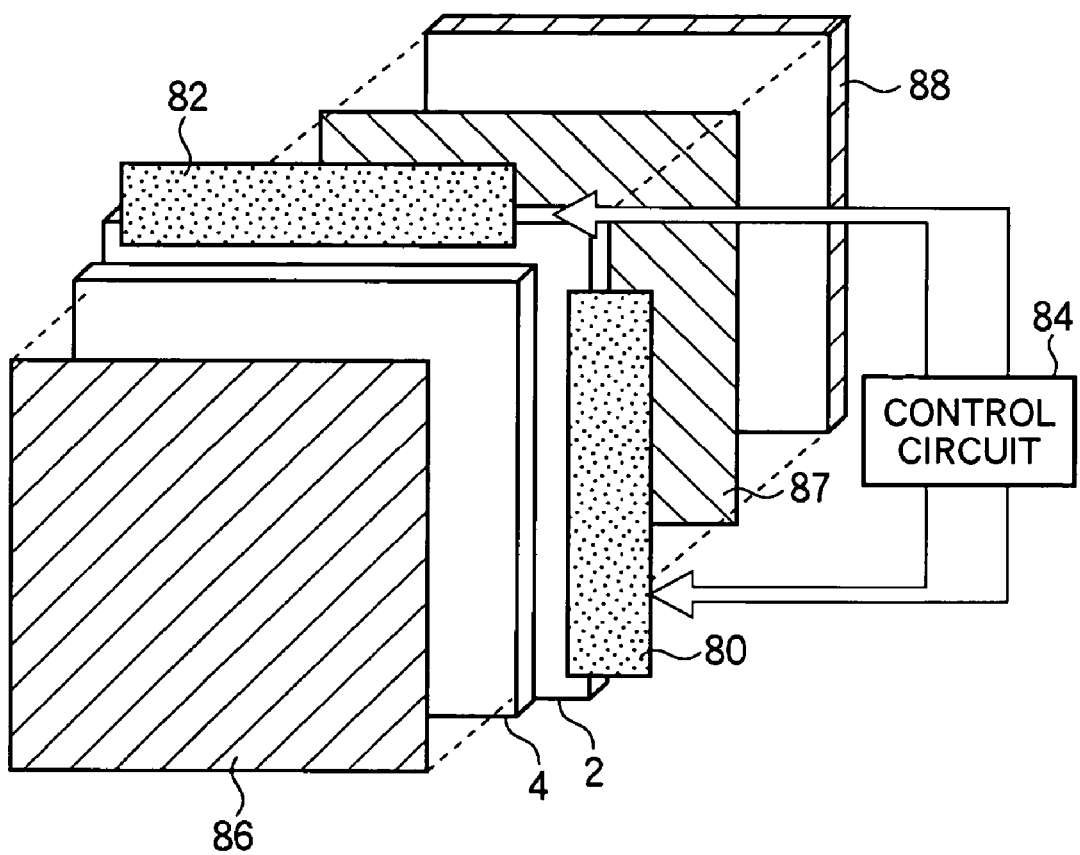
FIG. 1 is a view schematically illustrating the constitution of a liquid crystal display device according to an embodiment of the invention.

A liquid crystal display device and a method of manufacturing the same according to an embodiment of the invention will be described with reference to FIGS. 1 to 12. FIG. 1 is a view schematically illustrating the constitution of a liquid crystal display device according to the embodiment. Referring to FIG. 1, the liquid crystal display device has a TFT substrate 2 that is provided with gate bus lines and drain bus lines formed intersecting each other via an insulating film, TFTs (active elements) and pixel electrodes formed for the pixels. The liquid crystal display device further has an opposing substrate 4 having a CF and a common electrode formed thereon and is arranged opposing the TFT substrate 2. Liquid crystals having a negative dielectric anisotropy are sealed between the two substrates 2 and 4 to form a liquid crystal layer (not shown). Vertical alignment films (first alignment control layers) for vertically aligning the liquid crystal molecules are formed on the interfaces among the two substrates 2, 4 and the liquid crystal layer being applied thereon prior to sticking the two substrates 2 and 4 together.

To the TFT substrate 2, there are connected a gate bus line drive circuit 80 on which a driver IC is mounted for driving a plurality of gate bus lines, and a drain bus line drive circuit 82 on which a driver IC is mounted for driving a plurality of drain bus lines. Based on predetermined signals output from a control circuit 84, the drive circuits 80 and 82 output scanning signals and data signals onto a predetermined gate bus line or a drain bus line. A polarizing plate 87 is arranged on the surface of the TFT substrate 2 on the side opposite to the surface of forming the TFT elements. On the surface of the opposing substrate 4 on the side opposite to the surface of forming the common electrode, a polarizing plate 86 is arranged in cross nicol with respect to the polarizing plate 87. A back-light unit 88 is arranged on the surface of the polarizing plate 87 on the side opposite to the TFT substrate 2.

Figure 2:
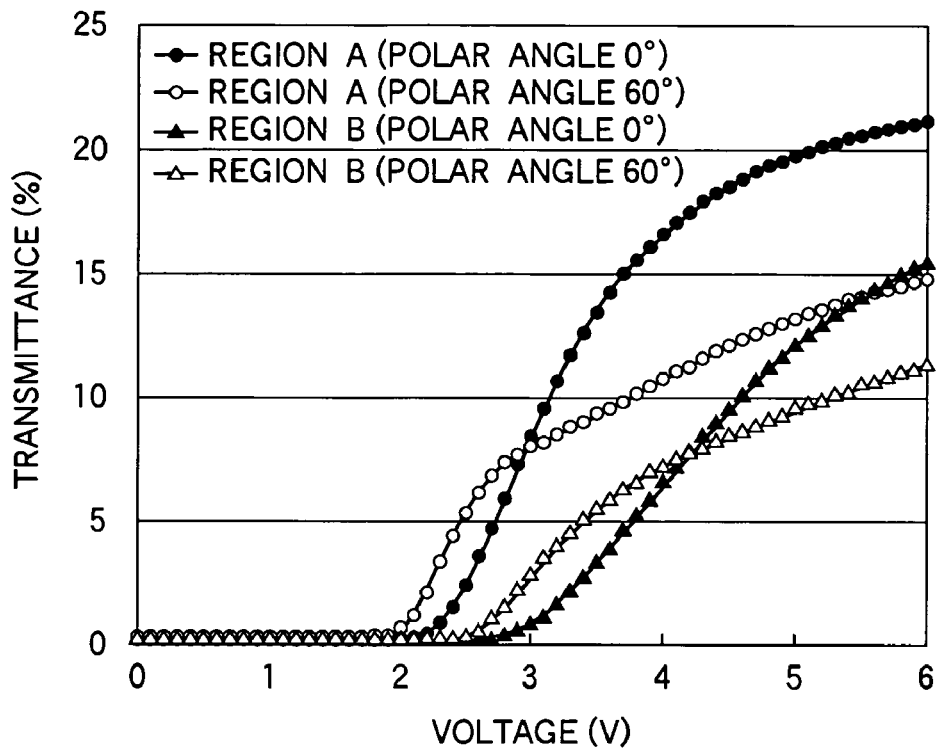
FIG. 2 is a graph illustrating gradation viewing angle characteristics on two regions in a pixel in the liquid crystal display device according to the embodiment of the invention.
Figure 3:
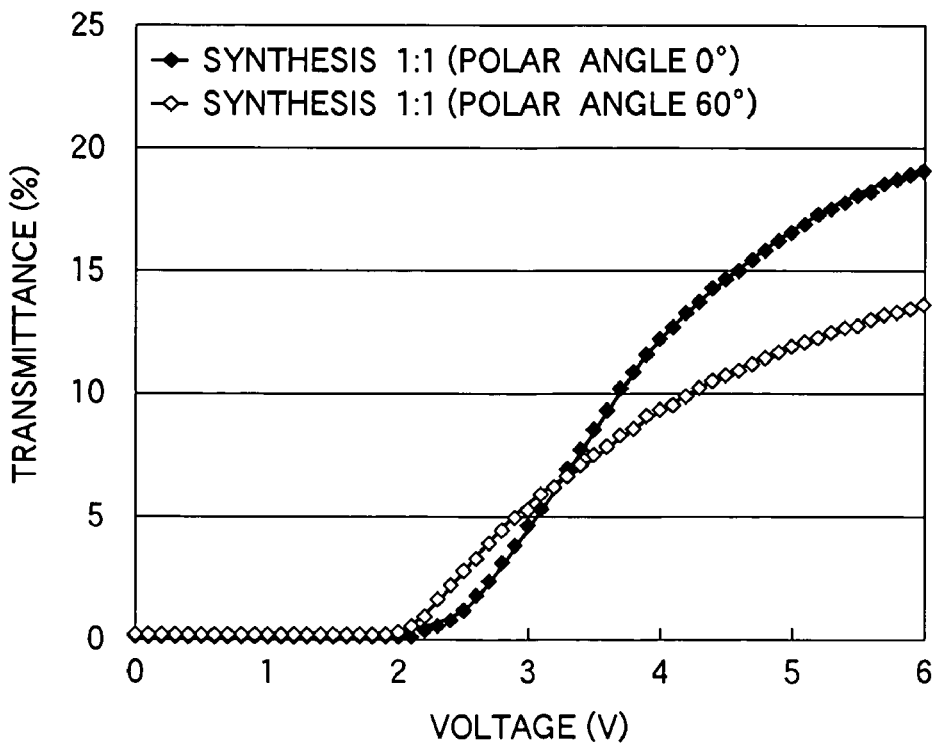
FIG. 3 is a graph illustrating gradation viewing angle characteristics of the whole pixels in the liquid crystal display device according to the embodiment of the invention.
Figure 15B:
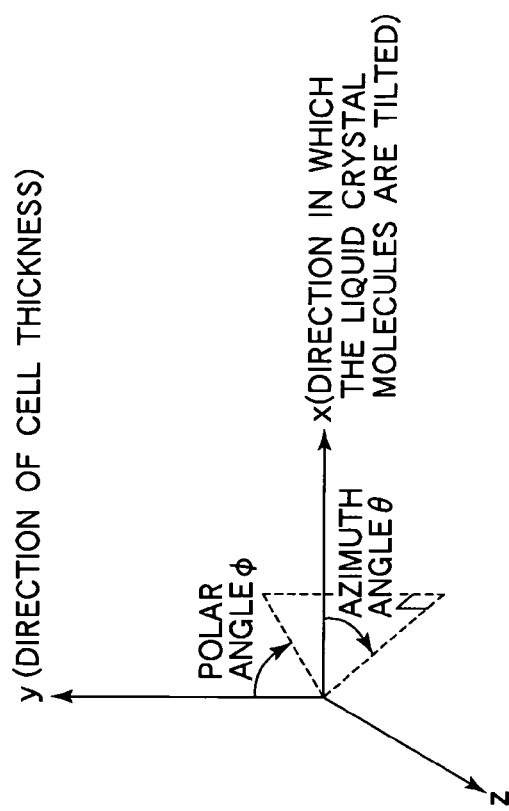
FIGS. 15A and 15B are views illustrating the gradation viewing angle characteristics of the liquid crystal display device of the MVA mode.
Figure 15A:
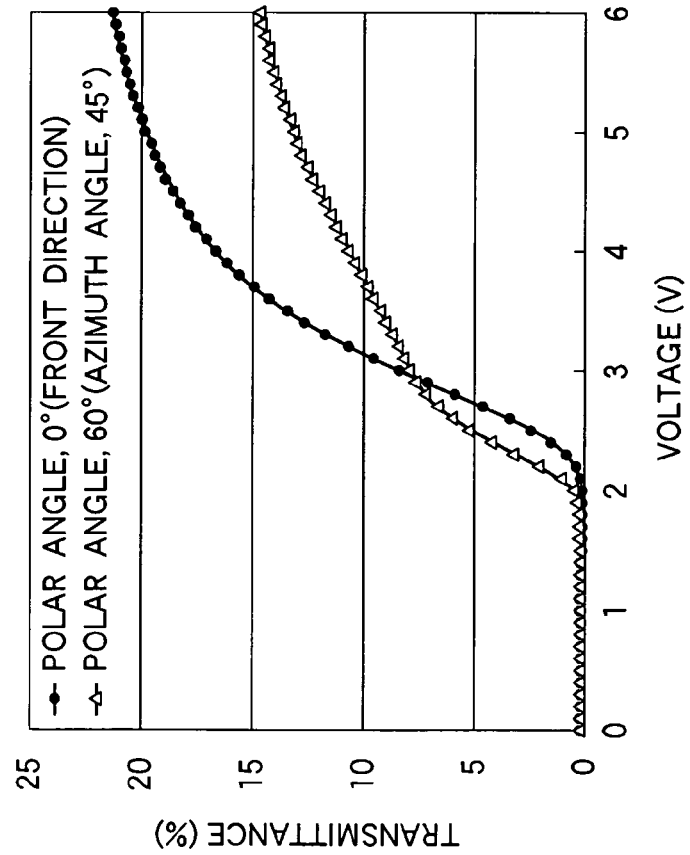

Described below is a basic principle of the liquid crystal display device according to the embodiment. FIG. 2 is a graph illustrating gradation viewing angle characteristics on two regions (region A and region B) in a pixel in the liquid crystal display device according to the embodiment of the invention, and FIG. 3 is a graph illustrating gradation viewing angle characteristics of the whole pixels by synthesizing the gradation viewing angle characteristics of the region A and the region B with their area ratio being 1:1. In this embodiment as shown in FIG. 2, two or more regions of different threshold voltages are formed in a display pixel, so that two or more T-V characteristics are present in each pixel. In the practical display, therefore, the T-V characteristics are averaged to exhibit T-V characteristics as shown in FIG. 3. When compared with the T-V characteristics of a conventional liquid crystal display device of FIGS. 15A and 15B, the T-V characteristics vary mildly in the tilted directions suppressing an increase or decrease in the transmittance in the tilted directions with respect to the transmittance in the front direction in each gradation. Thus, there are obtained favorable gradation viewing angle characteristics suppressing deviation of chromaticity of the displayed image in the front direction and in the tilted directions.

In this embodiment, regions of different threshold voltages are formed in a pixel by holding a liquid crystal layer between the substrates and, thereafter, partly forming an ultraviolet ray-cured product (second alignment control layer). That is, by forming the ultraviolet ray-cured product so as to constrain the liquid crystal molecules, there is partly formed in the pixel a region having a threshold voltage higher than the threshold voltage which is based on the alignment film. The gradation viewing angle characteristics can be necessarily improved as intended by the present invention if there are existing, in each pixel, two or more regions having different threshold voltages. To more distinctly obtain the effect, however, a difference of about 0.3 V is necessary at the smallest between the region having the lowest threshold voltage and the region having the highest threshold voltage. To realize a further increased effect, it is desired to impart a difference of about 0.5 to 0.7 volts to the threshold voltage between the two regions. When the difference in the threshold voltage is too great, on the other hand, brightness on the panel drops to an increased degree. Therefore, it does not mean that a large difference in the threshold voltage is always better.

The threshold voltage can also be varied by holding the liquid crystals into which a monomer is mixed between the substrates, irradiating ultraviolet rays to form an ultraviolet ray-cured product on the interface of the substrate thereby to stabilize the alignment of liquid crystals and, hence, to lower the threshold voltage. The ultraviolet ray-cured product is formed in a state where the pre-tilted angle of the liquid crystal molecules is decreased (i.e., in a state of being tilted from the direction of normal to the substrate). To obtain a high contrast, however, the pre-tilted angle must not be smaller than 86° and, more preferably, must not be smaller than 88°. A simple decrease in the pre-tilted angle by about 2° to 4° is not quite enough to realize the above difference in the threshold voltage. To realize the above difference in the threshold voltage, the pre-tilt must be so decreased as to satisfy the contrast. From the results of keen trial and error, it was learned that the above difference in the threshold voltage can be realized without sacrificing the contrast by increasing the threshold voltage by constraining the motion of the liquid crystal molecules relying on the ultraviolet ray-cured product in the state of initial alignment (vertical alignment).

In recent years, however, it has been very urged to increase the response speed of the liquid crystal display device to cope with the dynamic display. Even if the gradation viewing angle characteristics are improved, therefore, a technical superiority is not obtained unless the response time of liquid crystals is shortened. Through further trial and error, therefore, it was discovered that a pre-tilt can be imparted to the whole regions inclusive of the regions having a heightened threshold voltage, and that high gradation viewing angle characteristics as well as a high response speed can be realized. Concretely, a polymer is formed in a state where the liquid crystals are tilted by the application of a voltage so that all regions in the pixels possess a pre-tilted angle θp of not smaller than 86° but smaller than 90°. Here, if a tilted angle of liquid crystal molecules given by the vertical alignment film is denoted by α and a tilted angle of liquid crystal molecules when a voltage is applied is denoted by β, there holds that β<θp<α and that α≅90°.

Figure 4A:
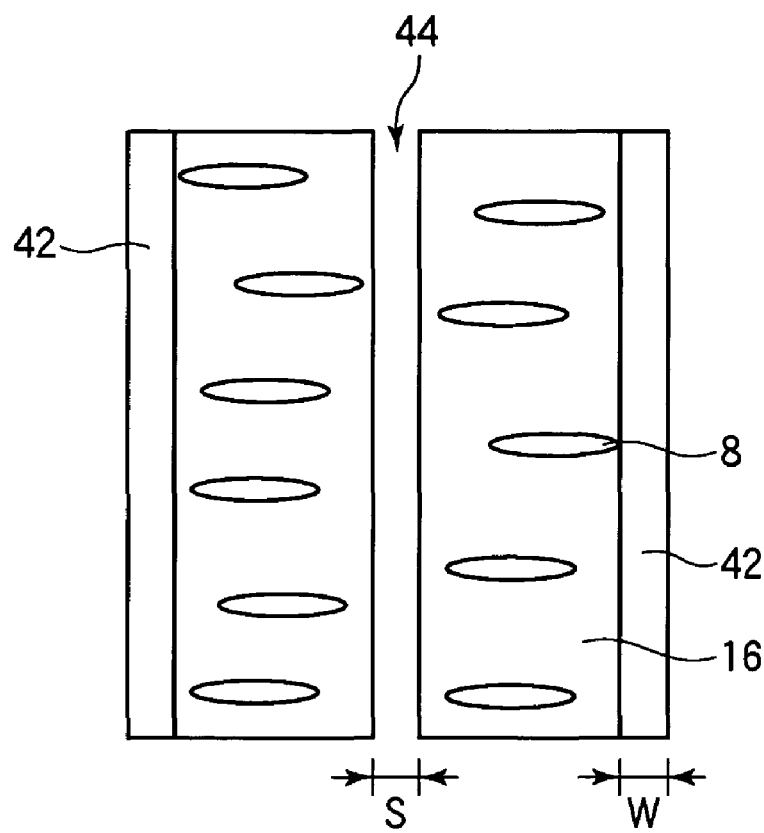
FIGS. 4A and 4B are views illustrating a partial constitution of a pixel in a liquid crystal display device of a conventional MVA mode.
Figure 4B:
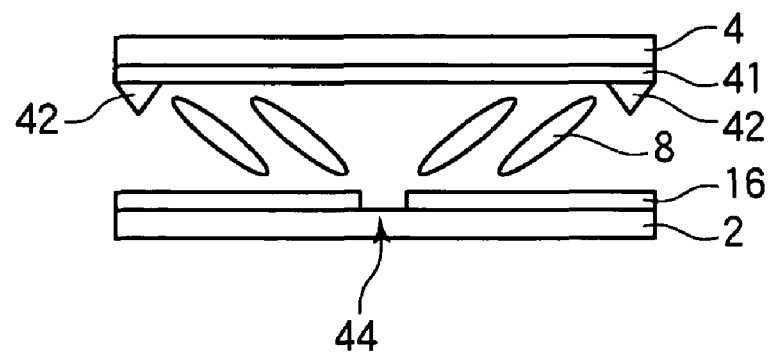
Figure 5A:
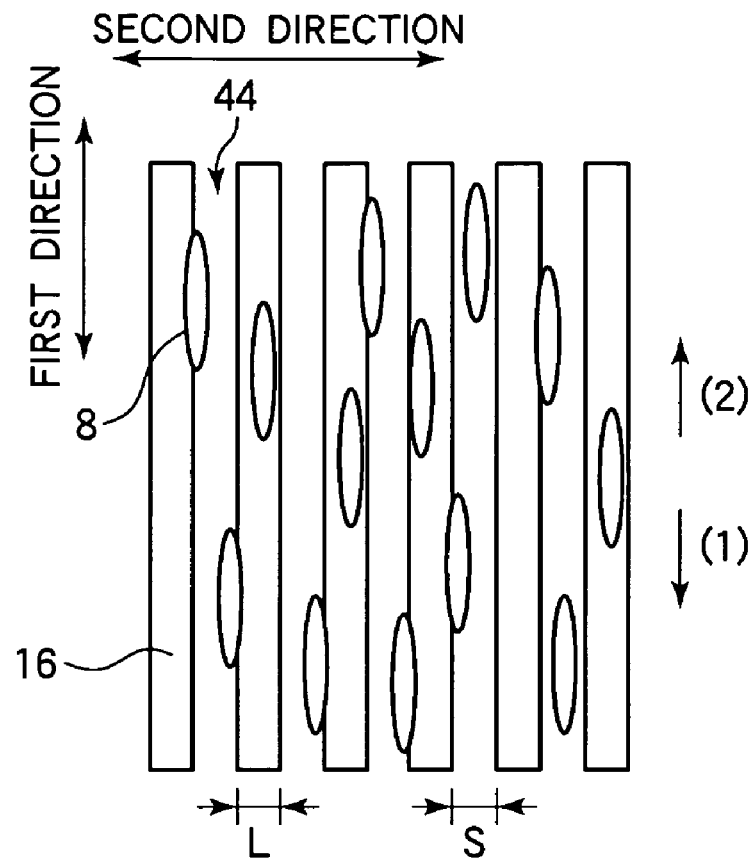
FIGS. 5A and 5B are views illustrating a partial constitution of a pixel in the liquid crystal display device of the embodiment of the invention.
Figure 5B:
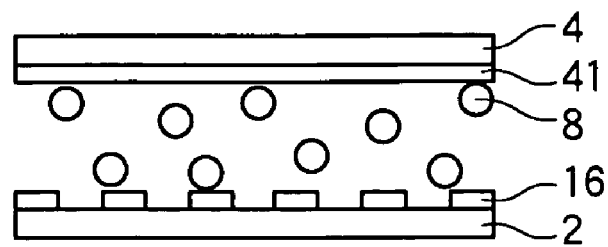
Figure 13A:
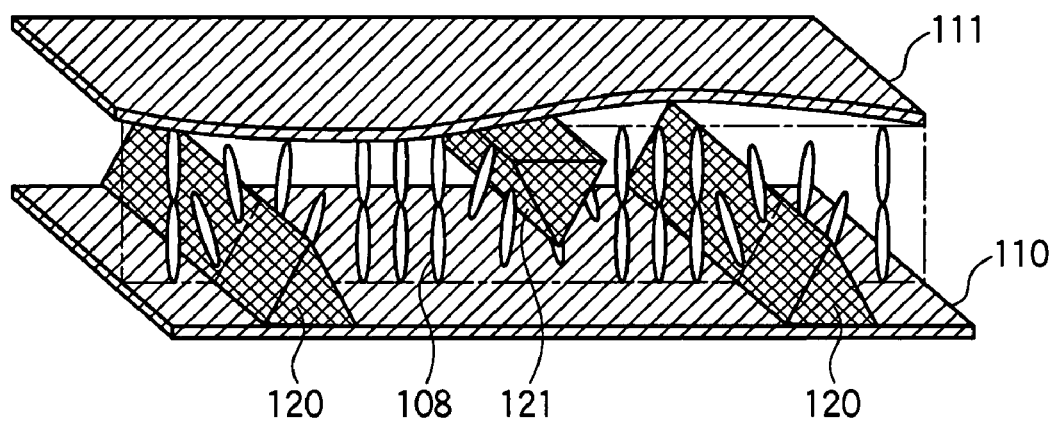
FIGS. 13A and 13B are schematic views of when the liquid crystal display device of the MVA mode is viewed aslant in cross section.
Figure 13B:
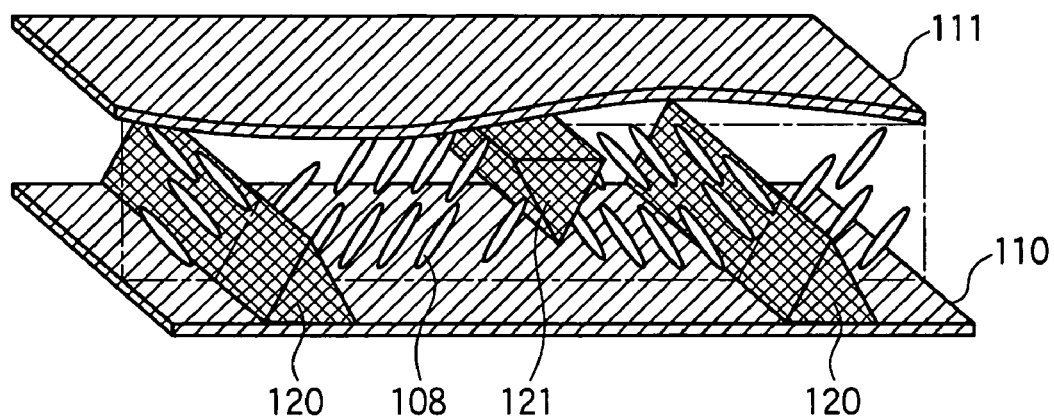

When the pre-tilt is imparted to the liquid crystal molecules in the display region as described above, the brightness can be further improved by combining the basic principle of this embodiment with the structure disclosed in the patent document 2. That is, in this embodiment, unlike in the conventional MVA structure as shown in FIG. 13A to FIG. 14, there is formed on one substrate a structural pattern that extends in a first direction in parallel with the surface of the substrate and that periodically changes in a second direction in parallel with the surface of the liquid crystal layer and perpendicularly to the first direction. Owing to this structure, the liquid crystal molecules are tilted in substantially the first direction. FIG. 4A illustrates a partial constitution of a pixel in a liquid crystal display device of a conventional MVA mode, and FIG. 4B illustrates the constitution of the pixel in cross section. On the other hand, FIG. 5A illustrates a partial constitution of a pixel in the liquid crystal display device of this embodiment, and FIG. 5B illustrates the constitution of the pixel in cross section. When the conventional liquid crystal display device is compared with the liquid crystal display device of this embodiment as shown in FIGS. 4A to 5B, it will, first, be understood that the liquid crystal molecules 8 are tilted in the directions which are different by 90°.

In the conventional constitution shown in FIGS. 4A and 4B, further, the width S of a slit (skipping of electrode) 44 formed in a pixel electrode 16 and the width W of a linear protrusion 42 formed on a common electrode 41 are about 10 μm, respectively, from the standpoint of safety in the alignment. The angle of tilt of the liquid crystal molecules 8 on the slit 44 and on the linear protrusion 42 when a voltage is applied is smaller than the angle of tilt thereof between the slit 44 and the linear protrusion 42. That is, in the regions on the slit 44 and on the linear protrusion 42, the effective retardation is small and the transmittance is low.

In the constitution of the embodiment shown in FIGS. 5A and 5B, on the other hand, the width S of the slits 44 and the width L of the linear pixel electrodes 16 are about 3 to 5 μm, respectively. The slits 44 (and pixel electrodes 16) extend in a first direction (up-and-down direction in the drawing). Further, the slits 44 (and pixel electrodes 16) are formed in a structural pattern which periodically changes in a second direction (right-and-left direction in the drawing) in parallel with the surface of the liquid crystal layer and perpendicularly to the first direction. With this structure, the liquid crystal molecules 8 are nearly uniformly tilted in the first direction (direction in which the pattern extends). Here, in the constitution of this embodiment unlike in the conventional MVA structure, the liquid molecules 8 on the slits 44 too are tilted like the liquid crystal molecules 8 on the pixel electrodes 16, and the transmittance drops little.

In this structure, however, the direction of tilt is limited in the first direction when the voltage is applied but the tilt is not limited in the direction indicated by either an arrow (1) or an arrow (2) in FIG. 5A. In practice, all electrode patterns in the pixel must be linked together. Therefore, the electrode pattern becomes, for example, as shown in FIG. 6A. In this case, the liquid crystal molecules 8 are finally uniformly tilted in a direction shown in FIG. 6B due to a tilted electric field at a coupling portion 16' of the pixel electrodes 16. Immediately after the voltage is applied (the same also holds immediately after a low gradation is changed over to a high gradation), however, there also occur regions where the liquid crystal molecules 8 are tilted in the opposite direction as shown in FIG. 6C. A boundary portion 46 is formed on a boundary to the region of a different azimuth of alignment of the liquid crystal molecules 8. A time is required before the alignment of liquid crystals is stabilized after the boundary portion 46 has diminished, turning out to be a problem of display such as a residual image.

When the above structure is employed in this embodiment, however, there occurs no problem in relation to the stability of alignment. That is, by forming a polymer to slightly tilt the liquid crystal molecules 8 in a state where no voltage is applied toward a direction in which they are finally stabilized, it is made possible to prevent the liquid crystal molecules 8 from being tilted in the opposite direction. By employing the above structural pattern in this embodiment, therefore, it is made possible to greatly improve the characteristics concerning all of three items which are important in the liquid crystal display device, i.e., (1) improved gradation viewing angle characteristics, (2) high response speed, and (3) high brightness.

Figure 7:
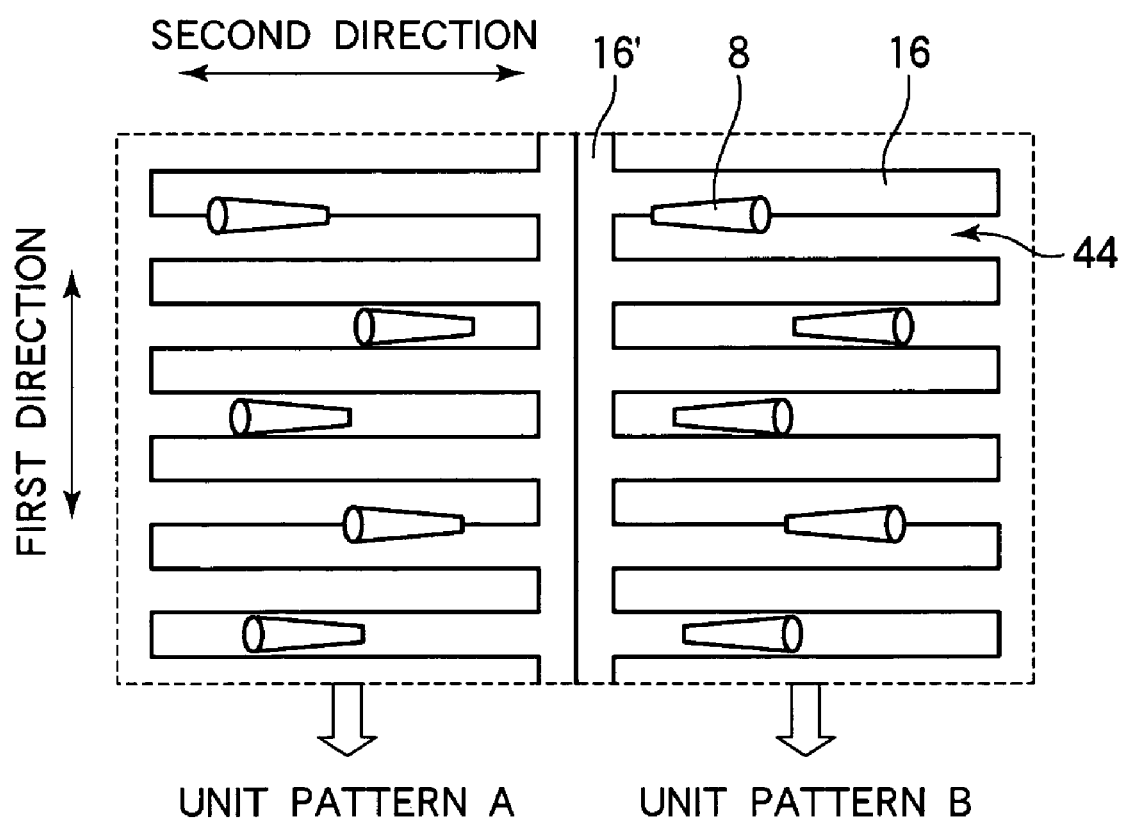
FIG. 7 is a view illustrating the constitution of a pixel of the liquid crystal display device according to the embodiment of the invention.
Figure 8:
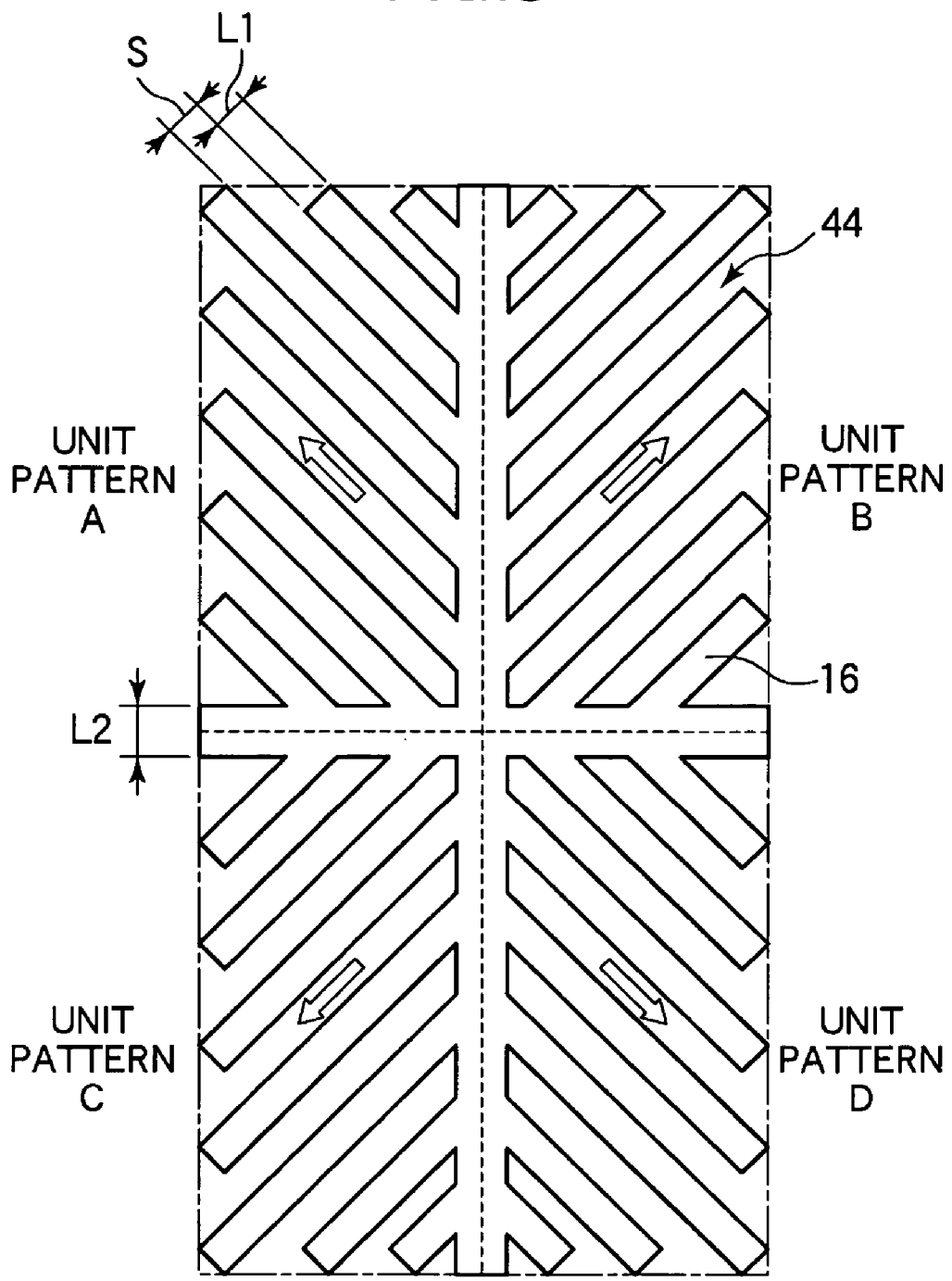
FIG. 8 is a view illustrating the constitution of a pixel of the liquid crystal display device according to the embodiment of the invention.

Upon being provided with the coupling portion 16' as shown in FIG. 7, further, the above structural pattern makes it possible to easily obtain an alignment divided into two. It can be said that the structural pattern is formed by a combination of two unit patterns A and B having dissimilar first and second directions divided by a broken line and a vertical solid line at the central portion in the drawing. Further, if the pixel electrodes 16 and the slits 44 in each pixel region are formed as shown in FIG. 8, the liquid crystal molecules are tilted in substantially four different directions to divide the alignment into four. Therefore, the viewing angle characteristics of the liquid crystal display device are greatly improved in the up-and-down direction and in the right-and-left direction. It can be said that the structural pattern is formed by a combination of four unit patterns A to D. Here, a set of unit patterns A and D, and a set of unit patterns B and C, have the first and second directions of the same combination. Further, the set of unit patterns A and D, and the set of unit patterns B and C, have the first and second directions which are not the same (e.g., nearly vertical). The structural pattern is formed, for example, on the side of the TFT substrate only but is not formed on the side of the opposing substrate.

In the above example, the structural pattern is formed by slits 44. However, the structural pattern may be formed by insulating (dielectric) members, such as linear protrusions made of a resist instead of the slits 44. Even when the linear protrusions are formed on the pixel electrodes 16 in the same pattern as the slits 44, the liquid crystals can similarly be controlled for their alignment to obtain the similar effect.

The degree of improving the gradation viewing angle characteristics varies depending upon the intensity of a difference in the threshold voltage and, similarly, upon the ratio (area ratio) of division into the regions of different threshold voltages. The gradation viewing angle characteristics are improved with an increase in the ratio of the region of a high threshold voltage decreasing, however, the transmittance. When two regions having different threshold voltages are formed in one pixel, a balance can be adjusted between the transmittance and the degree of improving the gradation viewing angle characteristics by varying the ratio of dividing the two regions in the pixel to be about 2:8 to 8:2. Improving the gradation viewing angle characteristics giving importance to the transmittance is effective in varying the ratio of division into a region of a low threshold voltage and a region of a high threshold voltage up to about 8:2. Conversely, when it is desired to increase the gradation viewing angle characteristics as much as possible despite of sacrificing the transmittance to some extent, it is recommended that the ratio of division into the region of a low threshold voltage and the region of a high threshold voltage is varied up to about 2:8. In particular, a good balance is obtained by setting the ratio of division into the two regions to be 7:3 to 3:7.

Described below is a method of forming regions of different threshold voltages in the pixel. First, an ultraviolet ray-cured product is preferentially formed by the selective irradiation with ultraviolet rays while masking part of the pixel. This step is regarded to be a first process for forming a region of a high threshold voltage. The first process is carried out in a state where the liquid crystal molecules are slightly tilted by applying a voltage to the liquid crystal layer. Thus, there is formed a region of a high threshold value having a pre-tilted angle θp.

Upon carrying out the first process only, a precursor of the ultraviolet ray-cured product remains in the liquid crystals in the region which is shielded or dimmed by the masking. As a second process, therefore, an ultraviolet ray-cured product is formed on the whole region of the pixel by the irradiation with an ultraviolet ray of an intensity which is weaker than that of the first process but which does not cause the threshold value to be shifted toward the high voltage side. Like the first process, the second process, too, is carried out while applying a voltage to the liquid crystal layer to impart the pre-tilted angle to the region of a low threshold value, too. In the second process, it is desired to irradiate the ultraviolet rays while applying, to the liquid crystal layer, a voltage lower than the threshold voltage of the region irradiated with light in the first process.

The ultraviolet ray irradiation in the second process can be carried out by using a mask. If an adjusting margin of the mask is taken into consideration, however, it is desired that the whole surface is irradiated with light at one time without using mask. Here, a decrease of difference in the threshold value can be further effectively suppressed by effecting the heat treatment prior to conducting the second process to uniformly disperse the precursor of the ultraviolet ray-cured product that is remaining in the whole surface of the panel.

Further, the second process irradiates the ultraviolet rays of an intensity smaller than that of the first process. To remove the residual monomer by the second process only, therefore, the ultraviolet rays must be irradiated for extended periods of time. When the ultraviolet rays are irradiated for extended periods of time while applying a voltage, however, a device for applying the voltage must be dedicated to a single piece of panel for extended periods of time to very deteriorate the working efficiency. After the second process is carried out for a predetermined required period of time to impart the pre-tilt, therefore, a third process is effectively carried out to irradiate the whole surface of the panel with ultraviolet rays without applying a voltage in order to finally remove the residual monomer. This enables the tact time to be shortened. Further, the intensity of the ultraviolet ray irradiation in the third process may be the same as that of the second process. However, the residual monomer can be decreased while suppressing a decrease of difference in the threshold voltage if the polymer is cured with the irradiation of a smaller intensity. For example, placing the material on a back-light that is turned on is an effective means as the third process. The substrate on the side of being irradiated may be reversed.

The liquid crystal display device according to this embodiment is manufactured by curing the monomer mixed in the liquid crystals on the inside by irradiating ultraviolet rays from the outer side of the substrate after a pair of glass substrates that are prepared are stuck together. It is therefore better that the glass substrate on the side of the source of irradiation light is not provided with a structure that shields the light as much as possible. In an ordinary liquid crystal display device, TFTs are formed on one substrate and CFs are formed on the other substrate. In this case, the ultraviolet rays reach the liquid crystal layer in large amounts when the ultraviolet rays are irradiated from the side of the TFT substrate. However, the TFT substrate, too, has light-shielding regions such as TFT elements and metal wirings. This embodiment becomes further effective if combined with a so-called COT (CF on TFT) technology forming TFT elements and CFs on one substrate. That is, the liquid crystal display device of the COT structure can use an opposing substrate obtained by forming a transparent electrode such as of ITO on the whole surface of a glass substrate without any light-shielding region. Therefore, there is easily realized a liquid crystal display device having high reliability without residual monomer.

The liquid crystal display device and the method of manufacturing the same according to the embodiment will now be concretely described with reference to Examples.

Example 1

In the negative liquid crystals of a refractive index anisotropy of 0.08, there was dissolved a bifunctional monomer having a ring structure in an amount of 2.0% by weight with respect to the liquid crystals, and a photopolymerization initiator was added in an amount of 2.0 mol % with respect to the monomer. Two pieces of glass substrates forming a transparent electrode of ITO was used to form a cell to be evaluated. On the transparent electrode of the one substrate, there were formed striped protrusions of a height of 1.5 μm and a width of 10 μm maintaining a gap of 35 μm by using a resist. In the transparent electrode of the other substrate, there were formed striped slits of a width of 10 μm maintaining a gap of 35 μm. Next, a vertical alignment film of polyamic acid was applied and formed thereon. Next, the two substrates were so overlapped that the protrusions and slits were in parallel maintaining an equal gap, and that the cell thickness was 4.25 μm. Thereafter, the above monomer-mixed liquid crystals were injected into between the substrates.

Figure 9:
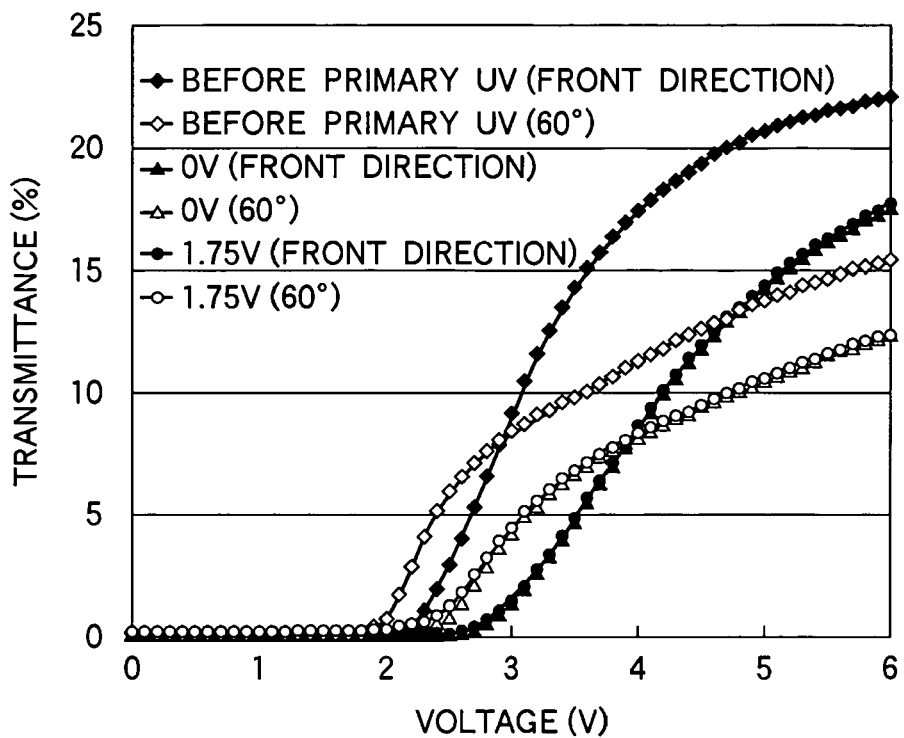
FIG. 9 is a graph illustrating the T-V characteristics of a liquid crystal display panel according to Example 1 of the embodiment of the invention.
Figure 10:
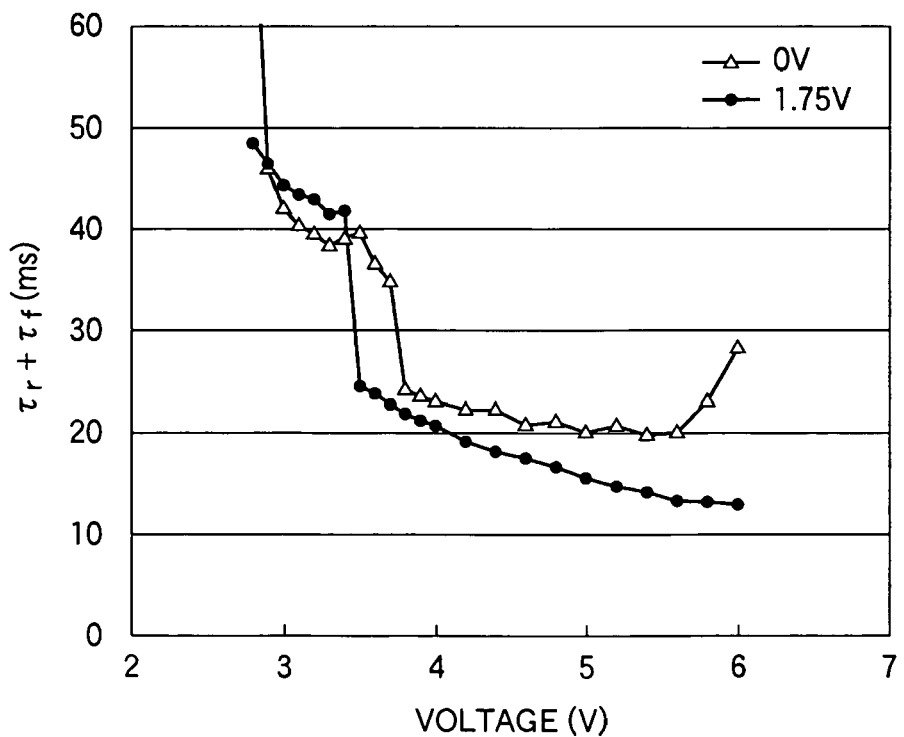
FIG. 10 is a graph illustrating response times of liquid crystals in the liquid crystal display panel according to Example 1 of the embodiment of the invention.

A one-half region of the transparent electrode was shielded with a mask, and a non-polarized ultraviolet ray was irradiated with 7 mW/cm$^2$ and 10 J/cm$^2$ to fabricate a liquid crystal display panel. The T-V characteristics of the liquid crystal display panel and the response time of the liquid crystals were measured. FIGS. 9 and 10 illustrate the results of the liquid crystal display panel irradiated with the ultraviolet rays while applying a voltage of 1.75 V to the liquid crystal layer in comparison with the results of the liquid crystal display panel irradiated with the ultraviolet rays in a state where no voltage was applied to the liquid crystal layer. In the region irradiated with the ultraviolet rays as shown in FIG. 9, the threshold voltage (here, a voltage at which the transmittance becomes 1%) was shifted toward the high-voltage side by more than about 0.6 V as compared to the non-irradiated region (before the primary UV). There was observed almost no change due to the application of a voltage (1.75 V/0 V) while the ultraviolet rays were being irradiated, and there was not observed, either, a decrease in the shifting amount of the threshold voltage toward the high-voltage side due to the application of a voltage.

Referring to FIG. 10, on the other hand, the response time (τr+τf) of liquid crystals was strikingly shortened in the case of the liquid crystal display panel irradiated with the ultraviolet rays while applying a voltage thereto. In particular, the speed was more than doubled on the high-voltage side.

Example 2

Pixel electrodes 16 of a shape shown in FIG. 8 were formed on one glass substrate. The width L1 of the pixel electrodes 16 and the width S of the slits 44 were set to be 3.5 μm, respectively, and the width L2 of a portion coupling the pixel electrode pattern was set to be 5 μm. A transparent electrode of ITO was formed on the whole surface of the other glass substrate. A vertical alignment film of polyamic acid was applied and formed on both substrates. The two substrates were stuck together such that the cell thickness was 4.25 μm, and the monomer-mixed liquid crystals same as those of Example 1 were injected into between the substrates.

Figure 11:
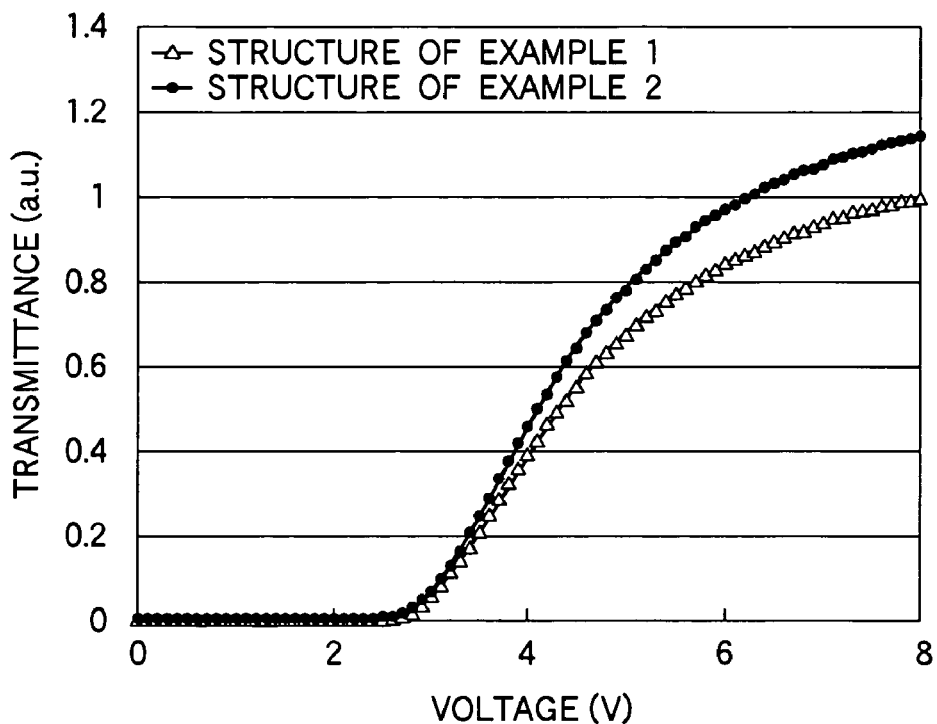
FIG. 11 is a graph comparing the T-V characteristics of the liquid crystal display panels according to Examples 1 and 2 of the embodiment of the invention.

After the alignment was stabilized by applying a voltage of 5.0 V to the liquid crystal layer, a non-polarized ultraviolet ray was irradiated with 7 mW/cm$^2$ and 10 J/cm$^2$ while lowering the voltage down to 1.75 V to fabricate a liquid crystal display panel. The T-V characteristics of the liquid crystal display panel and the response time of the liquid crystals were measured. FIG. 11 illustrate the T-V characteristics of the liquid crystal display panel of this Example in comparison with those of the liquid crystal display panel of Example 1. Despite of nearly the same threshold voltage, this Example made it possible to obtain a transmittance which was higher than that of Example 1 by about 15%.

Figure 12:
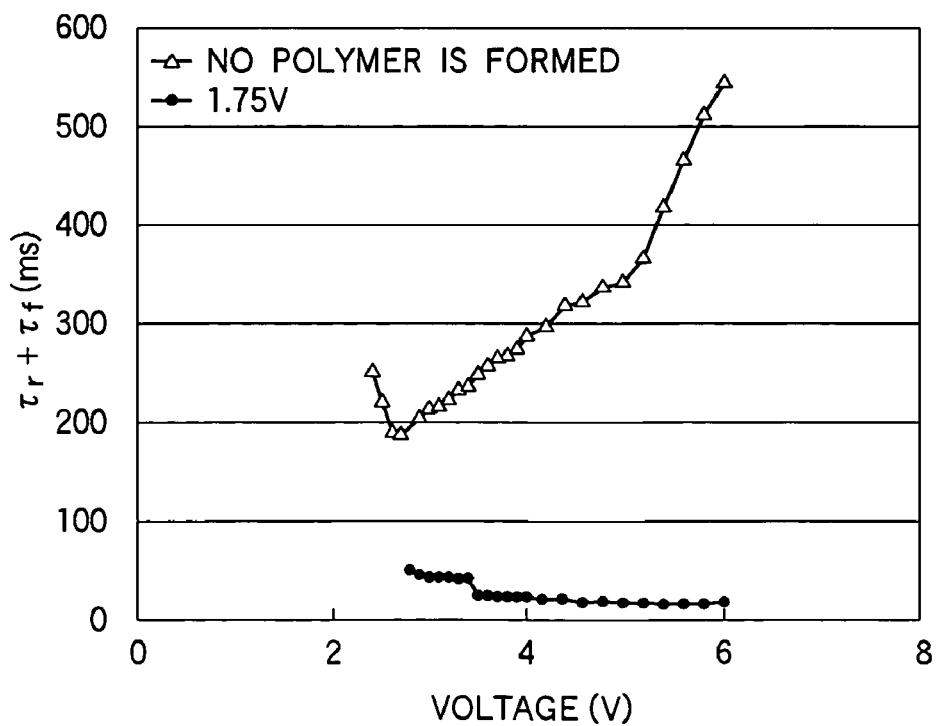
FIG. 12 is a graph comparing the response times of liquid crystals in the liquid crystal display panels before and after the irradiation with ultraviolet rays according to Example 2 of the embodiment of the invention.

FIG. 12 compares the response times of the liquid crystals of before being irradiated with the ultraviolet rays (no polymer has been formed) and after having been irradiated with the ultraviolet rays while applying a voltage of 1.75 V. Before being irradiated with the ultraviolet rays, the direction of tilt had not been determined and extended periods of time were required until the alignment of liquid crystals was stabilized. After having been irradiated with the ultraviolet rays, on the other hand, there were obtained response characteristics at a speed faster than that of the conventional MVA mode.

Example 3

Two pieces of evaluation cells were fabricated in the same manner as in Example 1. One cell was irradiated with a non-polarized ultraviolet ray of 0.5 mW/cm$^2$ and 10 J/cm$^2$ while applying a voltage of 2.6 V to the liquid crystal layer. The other cell was irradiated with a non-polarized ultraviolet ray of 0.5 mW/cm$^2$ and 3 J/cm$^2$ while applying a voltage of 2.6 V to the liquid crystal layer. Irradiation to the other cell with the non-polarized ultraviolet ray was further continued with 0.5 mW/cm$^2$ and 7 J/cm$^2$ but without applying the voltage. Comparison of the two evaluation cells proved that they exhibited almost the same T-V characteristics.

Example 4

There were fabricated an evaluation cell A by sticking a TFT substrate and a CF substrate together, and an evaluation cell B by sticking together one substrate forming the TFTs and CFs and another substrate forming only a transparent electrode of ITO. A vertical alignment film of polyamic acid was applied and formed on both substrates of each of the evaluation cells. The two cells possessed a thickness of 4.25 µm, respectively. Next, the monomer-mixed liquid crystals same as those of Example 1 were injected and sealed.

The evaluation cell A was irradiated with the ultraviolet rays from the side of the TFT substrate, and the evaluation cell B was irradiated with the ultraviolet rays from the side of the other substrate, respectively. The amount of irradiation was varied, and the residual monomer was measured by using the gas chromatography. Detection of the residual monomer has terminated, first, from the evaluation cell B. At a moment when no residual monomer was detected from the evaluation cell B, there was still detected the residual monomer in the evaluation cell A in an amount of about 3 to 5% of the monomer that was added.

According to the embodiment of the invention as described above, the liquid crystal display device and, particularly, the liquid crystal display device of the vertical alignment type as represented by the MVA mode exhibits good gradation viewing angle characteristics without producing deviation in the chromaticity between when the display screen is watched from the front direction and when the display screen is watched from a tilted direction.

What is claimed is:

1. A method of manufacturing a liquid crystal display device comprising:
   forming an electrode on at least one substrate of a pair of substrates to apply a voltage to the liquid crystal molecules,
   holding a first alignment control layer for substantially vertically aligning the liquid crystal molecules and a liquid crystal layer between said pair of substrates,
   forming a second alignment control layer of an ultraviolet ray-cured product after the liquid crystal layer is held between said pair of substrates;
   wherein said second alignment control layer is formed continuously in at least a substantial portion of each of a plurality of pixels and is formed through a first process of irradiating ultraviolet rays in a state where part of a display pixel is shielded or dimmed while applying a voltage to said liquid crystal layer, wherein
   after said first process, a second process is executed for irradiating ultraviolet rays in a manner that the threshold voltage in the region where the light is shielded or dimmed through said first process becomes lower than the threshold voltage in the region where the light is neither shielded nor dimmed through said first process, and wherein
   said second process irradiates ultraviolet rays to the whole panel surface.

2. A method of manufacturing a liquid crystal display device according to claim 1, wherein said second process irradiates ultraviolet rays at an intensity smaller than that of said first process.

3. A method of manufacturing a liquid crystal display device according to claim 1, wherein said second process irradiates ultraviolet rays while applying a voltage to said liquid crystal layer.

4. A method of manufacturing a liquid crystal display device comprising:
   forming an electrode on at least one substrate of a pair of substrates to apply a voltage to the liquid crystal molecules,
   holding a first alignment control layer for vertically aligning the liquid crystal molecules and a liquid crystal layer between said pair of substrates,
   forming a second alignment control layer of an ultraviolet ray-cured product after the liquid crystal layer is held between said pair of substrates;
   wherein said second alignment control layer is formed continuously in at least a substantial portion of each of a plurality of pixels and is formed through:
   a first process of irradiating ultraviolet rays in a state where part of a display pixel is shielded or dimmed;
   a second process of irradiating ultraviolet rays at an intensity smaller than that of said first process; and
   a third process of irradiating ultraviolet rays onto the whole panel surface at an intensity smaller than that of said second process and in a state of applying no voltage.

* * * * *